(12) United States Patent  
Krampotich et al.

(10) Patent No.: US 8,737,796 B2
(45) Date of Patent: May 27, 2014

(54) RAPID UNIVERSAL RACK MOUNT ENCLOSURE

(75) Inventors: Dennis Krampotich, Shakopee, MN (US); Jonathan Walter Coan, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 17 days.

(21) Appl. No.: 13/475,471

(22) Filed: May 18, 2012

(65) Prior Publication Data

US 2012/0318691 A1 Dec. 20, 2012

Related U.S. Application Data

(60) Provisional application No. 61/488,597, filed on May 20, 2011.

(51) Int. Cl.
*G02B 6/36* (2006.01)
(52) U.S. Cl.
USPC .......................................... 385/135; 385/138
(58) Field of Classification Search
None
See application file for complete search history.

(56) References Cited

U.S. PATENT DOCUMENTS

| | | | |
|---|---|---|---|
| 5,732,180 A * | 3/1998 | Kaplan | 385/135 |
| 6,220,413 B1 | 4/2001 | Walters et al. | |
| 6,275,639 B1 * | 8/2001 | Bolt et al. | 385/135 |
| 6,434,315 B1 * | 8/2002 | Grois et al. | 385/139 |
| 6,618,542 B2 * | 9/2003 | Wu et al. | 385/138 |
| 8,422,847 B2 | 4/2013 | Kowalczyk et al. | |
| 2005/0103515 A1 * | 5/2005 | Fuller et al. | 174/50 |
| 2005/0220422 A1 * | 10/2005 | Brief et al. | 385/72 |
| 2006/0056769 A1 * | 3/2006 | Khemakhem et al. | 385/55 |
| 2006/0110119 A1 * | 5/2006 | Kline et al. | 385/135 |
| 2009/0202214 A1 * | 8/2009 | Holmberg et al. | 385/135 |
| 2011/0164853 A1 * | 7/2011 | Corbille et al. | 385/135 |
| 2011/0317974 A1 | 12/2011 | Krampotich et al. | |

* cited by examiner

*Primary Examiner* — Mike Stahl
(74) *Attorney, Agent, or Firm* — Merchant & Gould P.C.

(57) ABSTRACT

A telecommunications device includes a main housing body having a major wall and a plurality of minor walls that extend outwardly from the major wall. A cover mounts to the main housing body at a location opposite the major wall. A connection interface is disposed between the cover and at least one of the minor walls. The connection interface allows the cover to be slid relative to the minor walls in a direction that is generally parallel to the major wall between an uncaptured position and a captured position. At least one telecommunications component is mounted within the main housing body. A first cable manager defines an opening for receiving a fiber optic cable. The first cable manager includes a first portion connected to the main housing body and a second portion connected to the cover.

15 Claims, 5 Drawing Sheets

RAPID UNIVERSAL RACK MOUNT ENCLOSURE

CROSS-REFERENCE TO RELATED APPLICATION

The present application claims the benefit of U.S. Provisional Patent Application Ser. No. 61/488,597, filed May 20, 2011, which application is hereby incorporated by reference in its entirety.

BACKGROUND

In the telecommunications industry, use of fiber optic cables for carrying transmission signals is rapidly growing. Fiber distribution frames are adapted to aid in the connection of fiber optic equipment. To connect fiber optic equipment in the fiber distribution frame or to connect fiber optic equipment between fiber distribution frames, fiber optic cable is routed between the fiber optic equipment and/or the fiber distribution frames. However, the length of fiber optic cable needed between the fiber optic equipment and/or the fiber distribution frames varies depending on the location of the equipment in the fiber distribution frame or the location of the fiber distribution frames. As a result, there is a need for a system to effectively manage varying lengths of fiber optic cable.

SUMMARY

An aspect of the present disclosure relates to a telecommunications device. The telecommunications device includes a main housing body having a major wall and a plurality of minor walls that extend outwardly from the major wall. The minor walls cooperate to define a perimeter of the main housing body. A cover mounts to the main housing body at a location opposite the major wall. The minor walls extend between the major wall and the cover when the cover is mounted to the main housing body. A connection interface is disposed between the cover and at least one of the minor walls. The connection interface allows the cover to be slid relative to the minor walls in a direction that is generally parallel to the major wall between an uncaptured position and a captured position. The cover can be removed from the main housing body in a direction that is generally perpendicular to the major wall when in the uncaptured position and is interlocked with the main housing body so as to not be removable from the main housing body in the direction generally perpendicular to the major wall. At least one telecommunications component is mounted within the main housing body. A first cable manager defines an opening for receiving a fiber optic cable. The first cable manager includes a first portion connected to the main housing body and a second portion connected to the cover. The first and second portions of the first cable manager cooperate to define the opening of the cable manager when the cover is in the captured position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
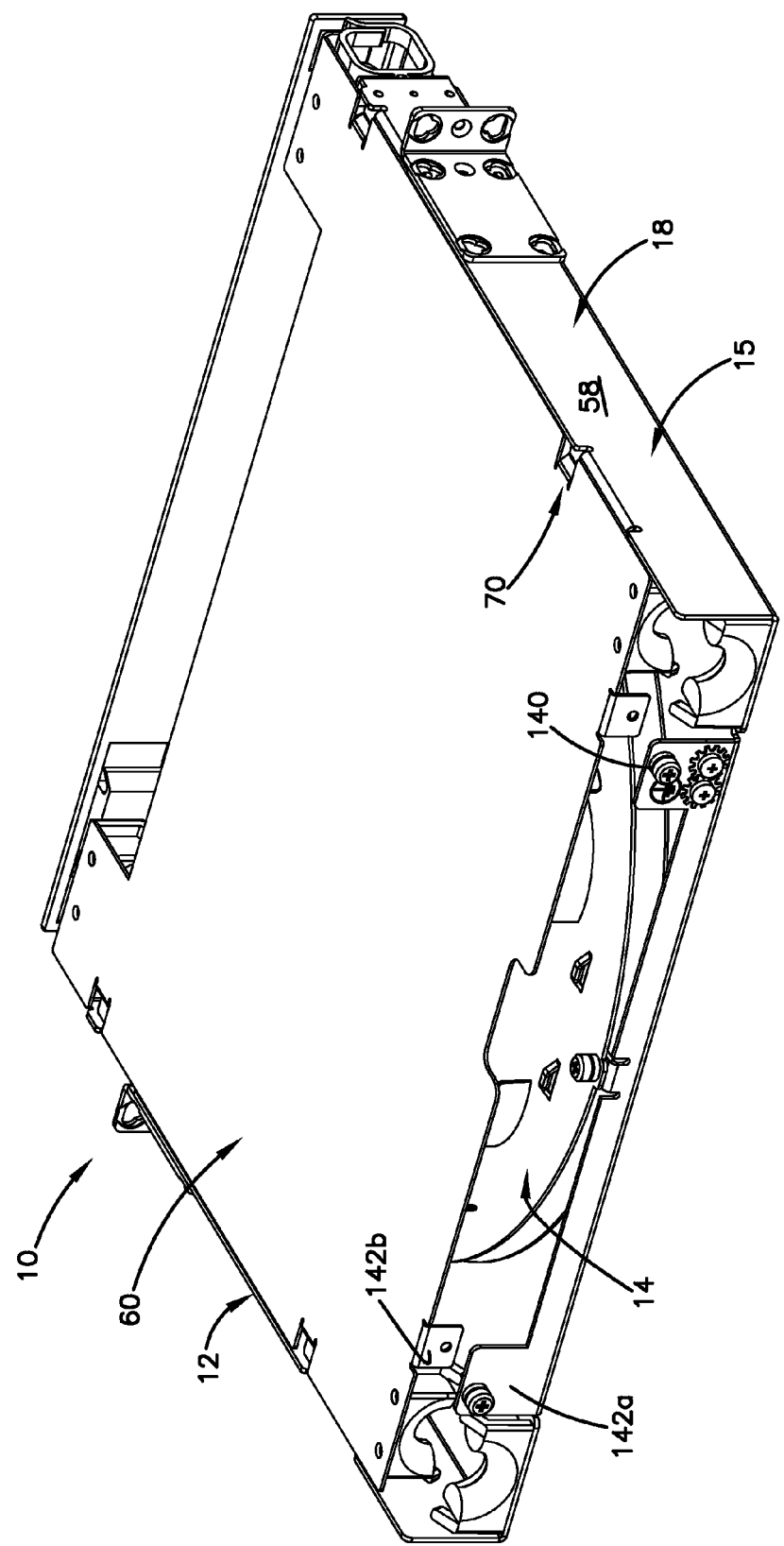
FIG. 1 is a perspective view of a telecommunications device having exemplary features of aspects in accordance with the principles of the present disclosure.

Referring now to FIG. 1, a telecommunications device 10 is shown. The telecommunications device 10 is configured for mounting to a rack of an optical distribution frame. The telecommunications device 10 includes an enclosure 12 and a telecommunications component 14 mounted within the enclosure 12.

Figure 2:
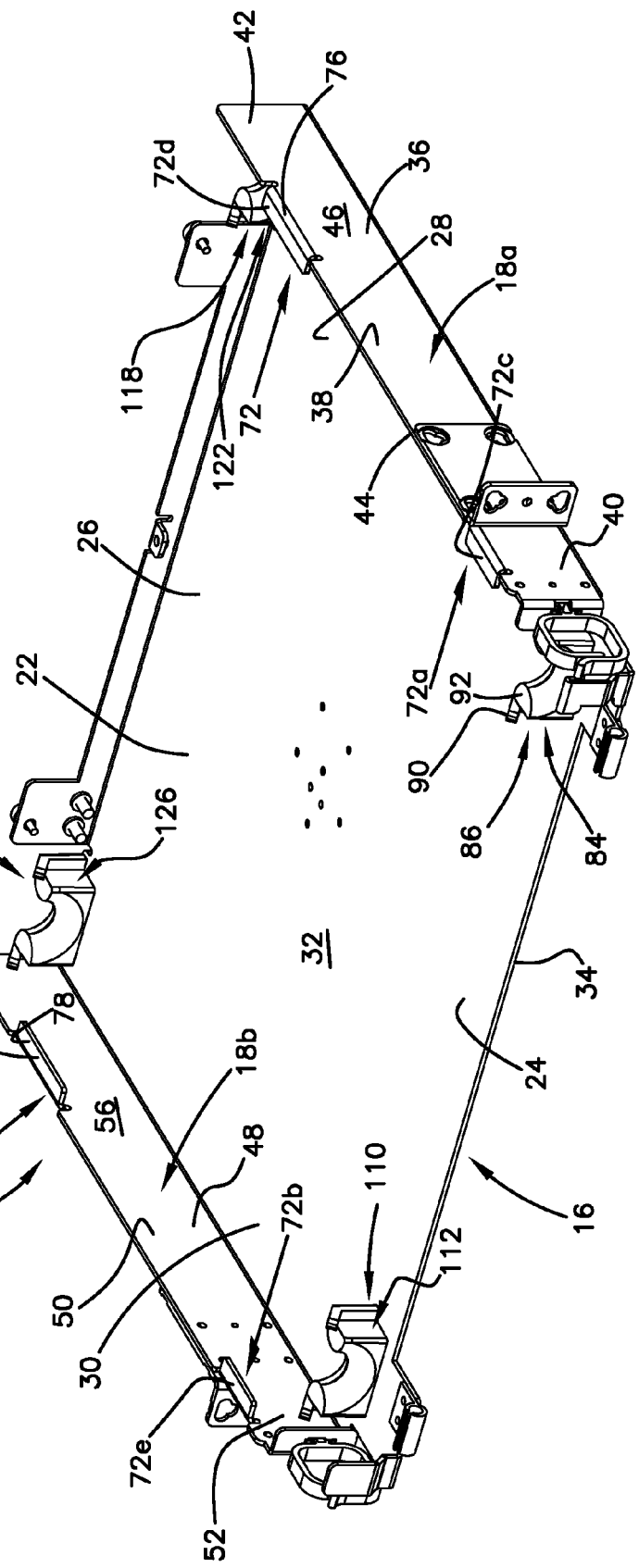
FIG. 2 is a perspective view of a main body housing suitable for use with the telecommunications device of FIG. 1.
Figure 3:
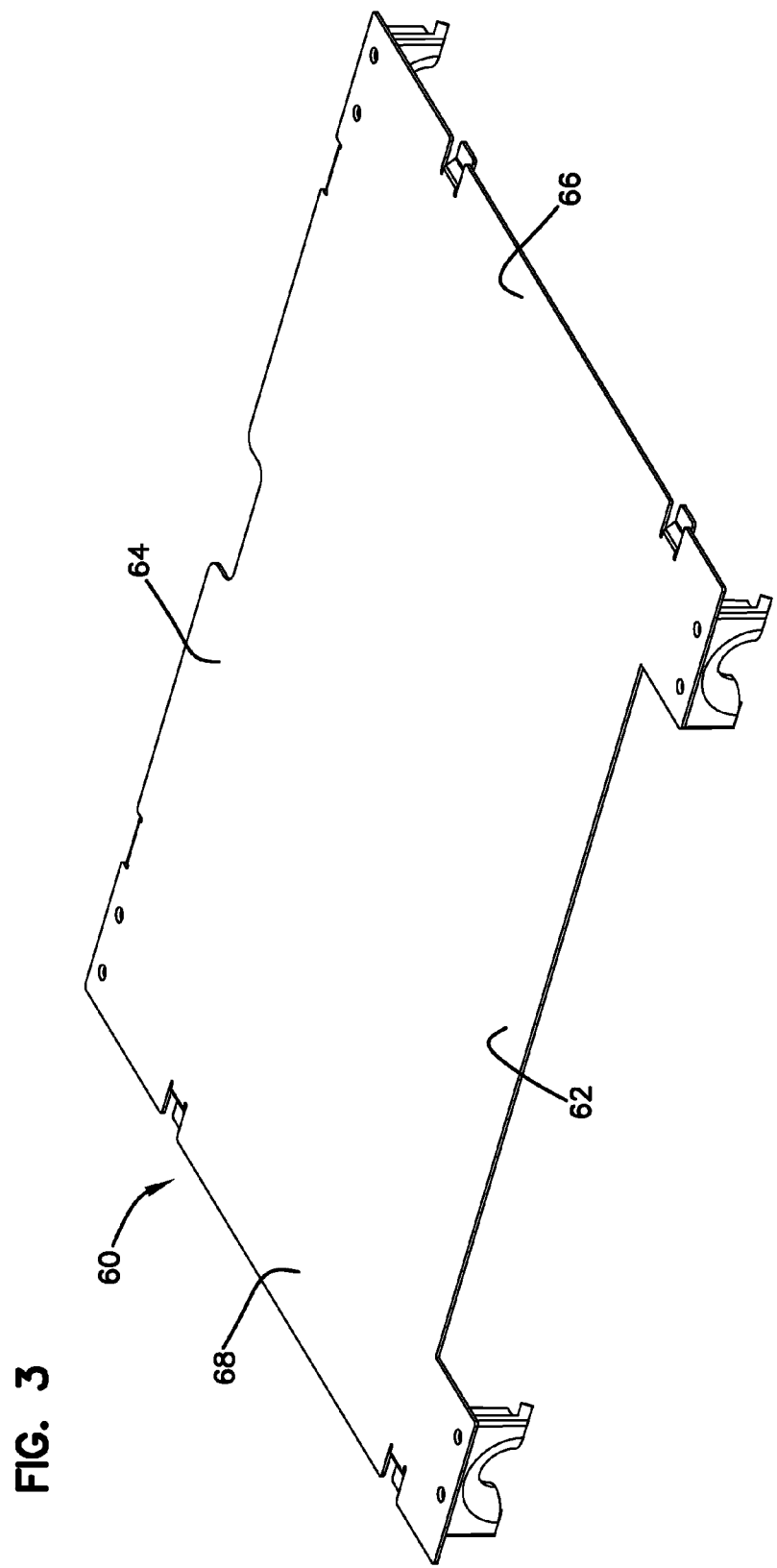
FIG. 3 is a perspective view of a cover suitable for use with the telecommunications device of FIG. 1.

Referring now to FIGS. 1 and 2, the enclosure 12 includes a main housing body 15. The main housing body 15 includes a major wall 16 and a plurality of minor walls 18. In the depicted embodiment, the main housing body 15 includes a first minor wall 18a and an oppositely disposed second minor wall 18b. The major wall 16 and the first and second minor walls 18a, 18b cooperatively define an interior region 22 of the enclosure 12. The major wall 16 and the first and second minor walls 18a, 18b cooperative further to define a perimeter of the enclosure 12.

The major wall 16 includes a first end 24, an oppositely disposed second end 26, a first side end 28 and an oppositely disposed second side end 30. The first side end 28 extends between the first and second ends 24, 26. The second side end 30 extends between the first and second ends 24, 26. The major wall 16 further includes an interior surface 32 and an exterior surface 34. The interior surface 32 faces in a direction toward the interior region 22 while the exterior surface 34 faces in an outwardly direction from the enclosure 12.

The first and second minor walls 18a, 18b extend outwardly from the major wall 16. In the depicted embodiment, the first and second minor walls 18a, 18b extend outwardly in a direction that is generally perpendicular to the major wall 16.

The first minor wall 18a includes a first side 36 and an oppositely disposed second side 38. In the depicted embodiment, the first side 36 is a bottom side or lower side while the second side 38 is a top side or upper side. The first side 36 is engaged to the first side end 24 of the major wall 16. In the depicted embodiment, the first side 36 and the first side end 24 of the major wall 16 are integral. In another embodiment, the first side 36 and the first side end 24 of the major wall 16 are monolithic.

The first minor wall 18a further includes a first end 40 that extends between the first and second sides 36, 38, an oppositely disposed second end 42 that extends between the first and second sides 36, 38, an inner surface 44 that faces in a direction toward the interior region 22 and an oppositely disposed outer surface 46 that faces in a direction outwardly from the enclosure 12.

The second minor wall 18b includes a first side 48 and an oppositely disposed second side 50. In the depicted embodiment, the first side 48 is a bottom side or lower side while the second side 50 is a top side or upper side. The first side 48 is engaged to the second side end 26 of the major wall 16. In the depicted embodiment, the first side 48 and the second side end 26 of the major wall 16 are integral. In another embodiment, the first side 48 and the second side end 26 of the major wall 16 are monolithic.

The second minor wall 18b further includes a first end 52 that extends between the first and second sides 48, 50, an oppositely disposed second end 54 that extends between the first and second sides 48, 50, an inner surface 56 that faces in a direction toward the interior region 22 and an oppositely disposed outer surface 58 that faces in a direction outwardly from the enclosure 12.

Referring now to FIGS. 1-4, the enclosure 12 further includes a cover 60. The cover 60 is engaged to the main housing body 15 at a location opposite the major wall 16 so that the minor walls 18 extend between the major wall 16 and the cover 60 when the cover 60 is engaged to the main housing body 15.

The cover 60 includes a first end 62 and an oppositely disposed second end 64. The cover 60 further includes a first side 66 that extends between the first and second ends 62, 64 and an oppositely disposed second side 68 that extends between the first and second ends 62, 64.

The cover 60 is configured to slide relative to the main housing body 15 between an uncaptured position and a captured position. In one embodiment, portions of the cover 60 overlap portions of at least one of the minor walls 18a, 18b in the captured position.

In the depicted embodiment, a connection interface 70 is disposed between the cover 60 and at least one of the minor walls 18a, 18b. The connection interface 70 allows the cover 60 to slide relative to the minor walls 18a, 18b in a direction that is generally parallel to the major wall 16. In one embodiment, the connection interface includes a tab 72 disposed on at least one of the minor walls 18a, 18b. In another embodiment, each of the first and second minor walls 18a, 18b includes the tab 72. In the depicted embodiment, the first minor wall 18a includes a first plurality of tabs 72a while the second minor wall 18b includes a second plurality of tabs 72b. The first plurality of tabs 72a includes a first tab 72c that is disposed at the second side 38 of the first minor wall 18a adjacent to the first end 40 of the first minor wall 18a and a second tab 72d that is disposed at the second side 38 adjacent to the second end 42. The second plurality of tabs 72b includes a first tab 72e that is disposed at the second side 50 of the second minor wall 18b adjacent to the first end 52 of the second minor wall 18b and a second tab 72f that is disposed at the second side 50 adjacent to the second end 54.

Each of the tabs 72 includes a body 74 having a base end 76 and a free end 78. The base end 76 is engaged to the second side 38, 50 of the first or second minor wall 18a, 18b, respectively. The free end 78 extends outwardly from the inner surface 44, 56 of the first or second minor wall 18a, 18b in a direction toward the interior region 22. In the depicted embodiment, the free end 78 extends outwardly from the inner surface 44, 56 of the first or second minor wall 18a, 18b in a direction that is generally perpendicular to the inner surface 44, 56.

The body 74 includes a first surface and an oppositely disposed second surface. In the depicted embodiment, the first surface faces in a direction outwardly from the enclosure 12. The second surface faces in a direction toward the interior region 22.

In the depicted embodiment, the connection interface 70 includes a third plurality of tabs 80a disposed on the first side 66 of the cover 60 and a fourth plurality of tabs 80b disposed on the second side 68 of the cover 60. The third plurality of tabs 80a are adapted to be positioned opposite the second surface of the body 74 of the first plurality of tabs 72a when the cover 60 is in the captured position while the fourth plurality of tabs 80b are adapted to be positioned opposite the second surface of the body 74 of the second plurality of tabs 72b when the cover 60 is in the captured position.

Figure 4:
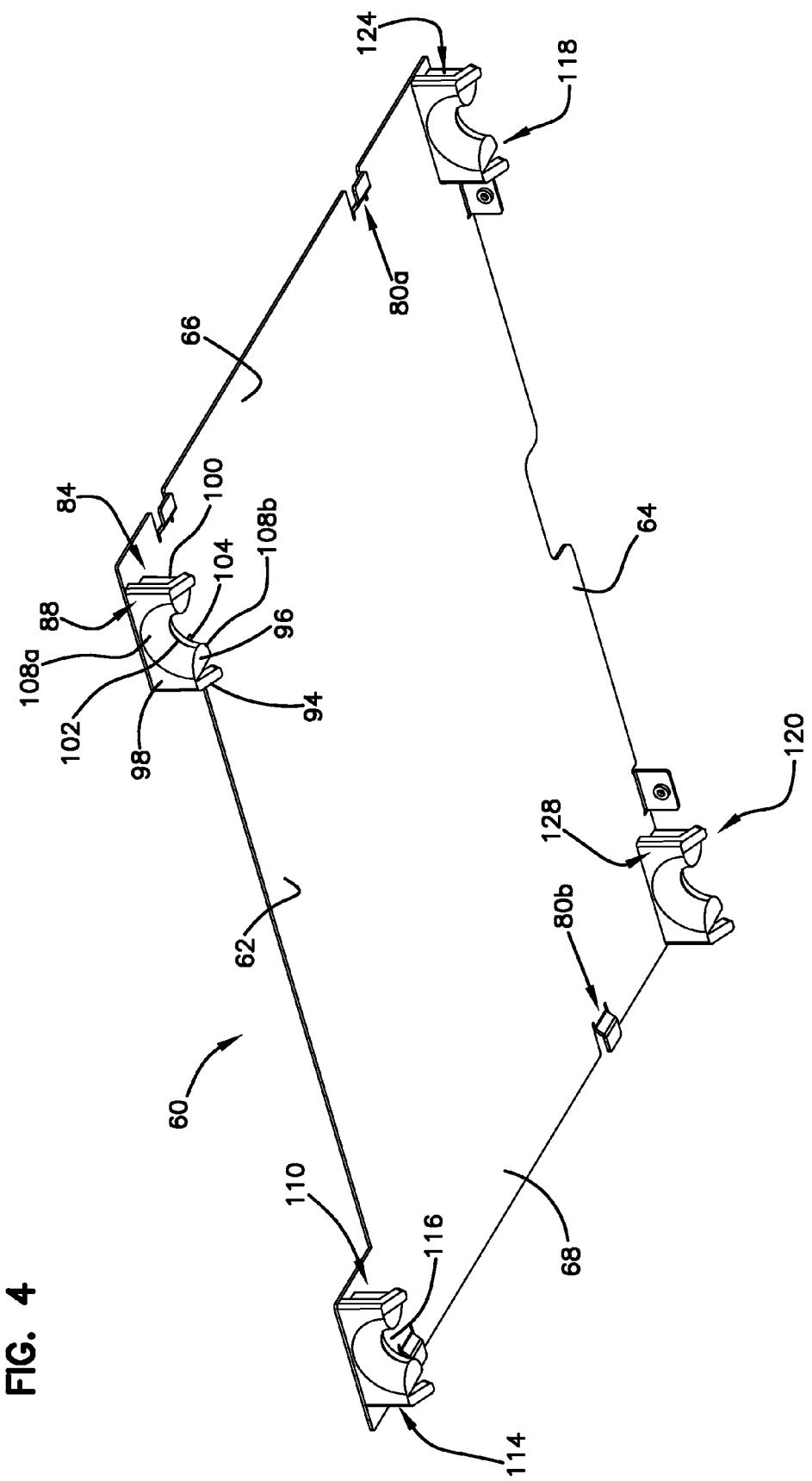
FIG. 4 is a perspective view of the cover of FIG. 3.

Referring now to FIGS. 1, 2 and 4, the enclosure 12 further includes a cable manager 84. The cable manager 84 includes a first portion 86 and a second portion 88. The first portion 86 is connected to the main housing body 15 while the second portion 88 is connected to the cover 60. In the depicted embodiment, the first portion 86 is connected to the major wall 16 at a location that is adjacent to the first end 24 and the first side end 28. The second portion 88 is connected to the cover 60 at a location that is adjacent to the first end 62 and the first side 66.

The first portion 86 includes a first plurality of projections 90 that extend outwardly from a free end 92 of the first portion 86. In the depicted embodiment, the first plurality of projections 90 extends outwardly at an oblique angle relative to the free end 92.

The second portion 88 includes a second plurality of projections 94 that extend outwardly from a free end 96 of the second portion 88. In the depicted embodiment, the second plurality of projections 94 extends outwardly at an oblique angle relative to the free end 96. The first and second portions 86, 88 are adapted to interlock when the cover 60 is in the captured position.

The cable manager 84 includes a first side 98 and an oppositely disposed second side 100. The first and second portions 86, 88 of the cable manager 84 cooperatively define an opening 102. The opening 102 extends through the first and second sides 98, 100. The cable manager 84 fully encloses the opening 102 when the cover 60 is in the captured position.

The cable manager 84 includes an inner surface 104. The inner surface 104 of the cable manager 84 defines the opening 102. In the depicted embodiment, the inner surface 104 is curved to provide bend radius protection to a fiber optic cable disposed in the opening 102.

The cable manager 84 includes a mid-region disposed between the first and second sides 98, 100. The cable manager 84 further includes a first curve 108a disposed adjacent to the first side 98 and a second curve 108b disposed adjacent to the second side 100. The first curve 108a flares outwardly as the opening 102 extends in a first direction from the mid-region 106 toward first side 98 of the cable manager 84. The second curve 108b flares outwardly as the opening 102 extends in a second direction from the mid-region toward the second side 100 of the cable manager 84. In one embodiment, a radius of curvature of the first curve 108a is generally equal to a radius of curvature of the second curve 108b.

In the depicted embodiment, the enclosure 12 further includes a second cable manager 110. The second cable manager 110 includes a first portion 112 and a second portion 114. The first portion 112 is connected to the main housing body 15 while the second portion 114 is connected to the cover 60. In the depicted embodiment, the first portion 112 is connected to the major wall 16 at a location that is adjacent to the first end 24 and the second side end 30. The second portion 114 is connected to the cover 60 at a location that is adjacent to the first end 62 and the second side 68.

The second cable manager 110 defines a second opening 116. In the depicted embodiment, the second cable manager 110 has a structure similar to the cable manager 84. Any structure described with regard to the cable manager 84 may be included in the second cable manager 110.

The enclosure 12 further includes a third cable manager 118 and a fourth cable manager 120. In the depicted embodiment, the third and fourth cable managers 118, 120 have structures similar to the cable manager 84. Any structure described with regard to the cable manager 84 may be included in the third and fourth cable managers 118, 120.

The third cable manager 118 includes a first portion 122 and a second portion 124. The first portion 122 is connected to the main housing body 15 while the second portion 124 is connected to the cover 60. In the depicted embodiment, the first portion 122 is connected to the major wall 16 at a location that is adjacent to the second end 26 and the first side end 28. The second portion 124 is connected to the cover 60 at a location that is adjacent to the second end 64 and the first side 66.

The fourth cable manager 120 includes a first portion 126 and a second portion 128. The first portion 126 is connected to the main housing body 15 while the second portion 128 is connected to the cover 60. In the depicted embodiment, the first portion 126 is connected to the major wall 16 at a location that is adjacent to the second end 26 and the second side end 30. The second portion 128 is connected to the cover 60 at a location that is adjacent to the second end 64 and the second side 68.

In the depicted embodiment, the cable manager 84 is disposed adjacent a first corner of the enclosure 12. The second cable manager 110 is disposed adjacent a second corner of the enclosure 12. The third cable manager 118 is disposed adjacent a third corner of the enclosure 12. The fourth cable manager 120 is disposed adjacent a fourth corner of the enclosure 12.

Figure 5:
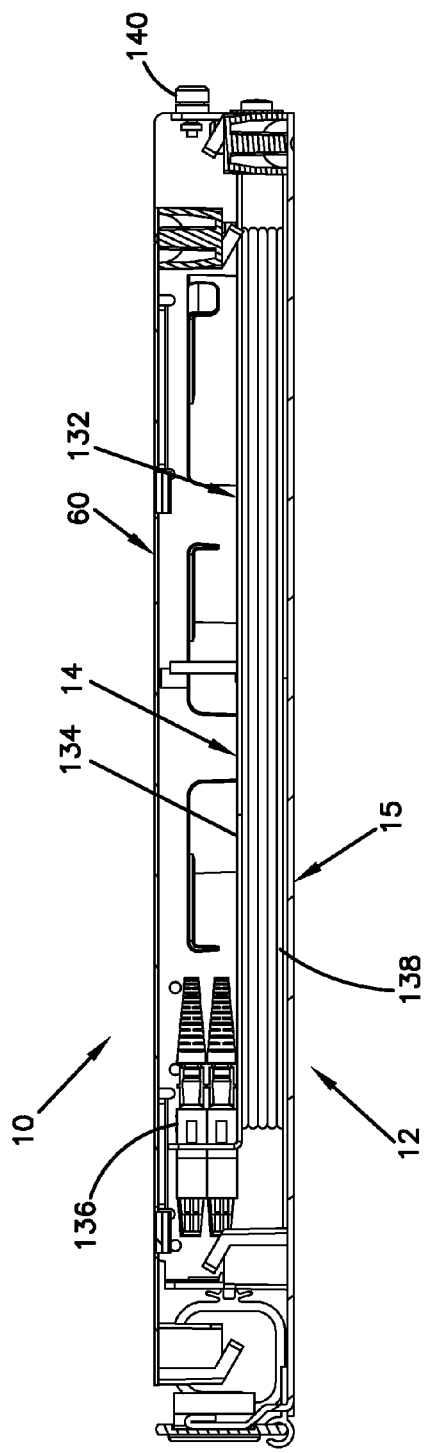
FIG. 5 is a cross-sectional view of the telecommunications device of FIG. 1 showing the cover in the uncaptured position.
Figure 6:
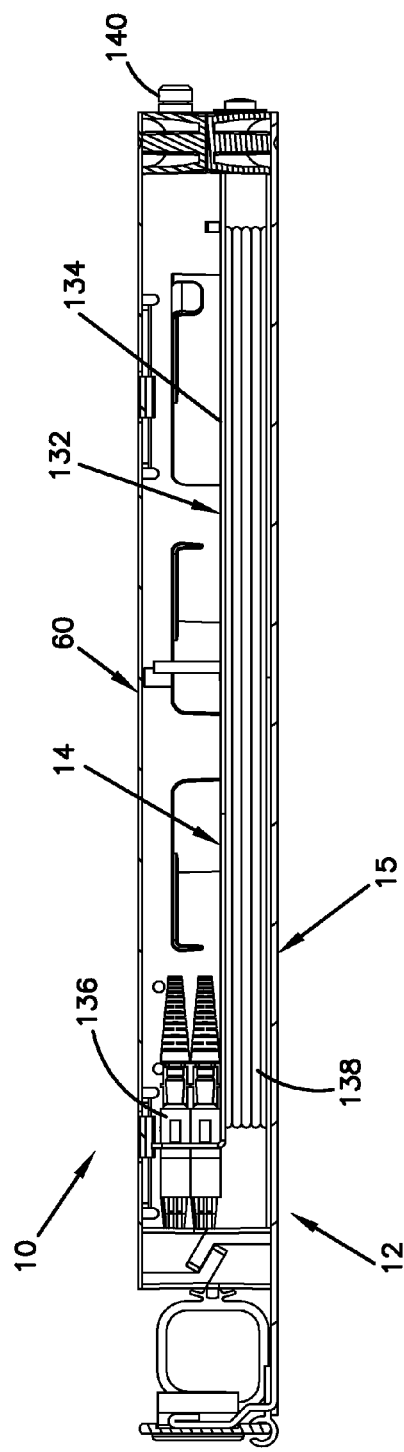
FIG. 6 is a cross-sectional view of the telecommunications device of FIG. 1 showing the cover in the captured position.

Referring now to FIGS. 5 and 6, the enclosure 12 includes at least one telecommunications component 14 mounted within the main housing body 15. In the depicted embodiment, the telecommunications component 14 is a spool 132. The spool 132 rotates relative to the main housing body 15. The spool 132 includes a first flange 134 and a drum. A plurality of fiber optic adapters 136 is disposed on the first flange 134. The fiber optic adapters 136 are adapted to receive fiber optic connectors. A fiber optic cable 138 is wrapped around the spool 132.

Referring now to FIGS. 1-6, the attachment of the cover 60 to the main housing body 15 will be described. The cover 60 is placed over the main housing body 15 so that the tabs 84 of the cover 60 are offset from the tabs 72 of the main housing body 15. The cover 60 is slid in a first direction toward the captured position. In the captured position, the tabs 72 and the tabs 84 overlap preventing the cover 60 from being removed from the main housing body 15 in a direction that is generally perpendicular to the major wall 16 of the main housing body 15.

When the cover 60 is in the captured position, the cover 60 is secured to the main body housing 15. In one embodiment, fasteners 140 (e.g., screws, bolts, adhesive, rivets, cotter pins, ties, etc.) are used to secure the cover 60 to the main body housing 15. In the depicted embodiment, the fasteners 140 are thumbscrews.

In the depicted embodiment, the thumbscrew 140 passes through a hole in an attachment tab 142a of the main housing body 15 and a hole in an attachment tab 142b of the cover 60. In the depicted embodiment, the thumbscrew 140 is in threaded engagement with the hole in the attachment tab 142b of the cover 60.

With the cover 60 secured to the main housing body 15, the fiber optic cable 138 can be paid out from the enclosure 12. With one end of the fiber optic cable 138 engaged to the fiber optic adapters 136, the opposite end is pulled through the opening of one of the cable managers (i.e., cable manager 84, second cable manager 110, third cable manager 118 and fourth cable manager 120). As the fiber optic cable 138 is pulled out of the enclosure, the spool 132 rotates in the enclosure 12. As the fiber optic adapters are disposed on the first flange 134 of the spool 132, the fiber optic cable 138 can remain engaged with the fiber optic adapters 136 as the fiber optic cable 138 is paid out.

To remove the cover 60 from the main housing body 15, the fasteners 140 are removed/loosened. The cover 60 is slid in a second direction toward the uncaptured position. With the cover 60 in the uncaptured position, the cover 60 is removed from the main housing body 15 in a direction that is generally perpendicular to the major wall 16.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A telecommunications device comprising:
   a main housing body including a major wall and a plurality of minor walls that extend outwardly from the major wall, the minor walls cooperating to define a perimeter of the main housing body;
   a cover that mounts to the main housing body at a location opposite from the major wall, the minor walls extending between the major wall and the cover when the cover is mounted to the main housing body;
   a connection interface between the cover and at least one of the minor walls, the connection interface allowing the cover to be slid relative to the minor walls in a direction generally parallel to the major wall between an uncaptured position and a captured position, wherein the cover can be removed from the main housing body in a direction generally perpendicular to the major wall when in the uncaptured position and is interlocked with the main housing body when in the captured position so as to not be removable from the main housing body in the direction generally perpendicular to the major wall;
   at least one telecommunications component mounted within the main housing body, wherein the telecommunications component includes a spool on which the fiber optic cable is wrapped; and
   a first cable manager defining an opening for receiving a fiber optic cable, the first cable manager including a first portion connected to the main housing body and a second portion connected to the cover, wherein the first and second portions of the first cable manager cooperate to define the opening of the cable manager when the cover is in the captured position.

2. The telecommunications device of claim 1, wherein the first and second portions interlock when the cover is in the captured position.

3. The telecommunications device of claim 1, further comprising a second cable manager including a third portion connected to the main housing body and a fourth portion connected to the cover, wherein the third and fourth portions cooperate to form an opening of the second cable manager when the cover is in the captured position.

4. The telecommunications device of claim 1, wherein the spool is rotatable relative to the main housing body.

5. The telecommunications device of claim 4, wherein the spool is rotatable about an axis of rotation that is generally perpendicular relative to the main wall.

6. The telecommunications device of claim 5, wherein the fiber optic cable includes a plurality of optical fibers terminated by fiber optic connectors, wherein a plurality of fiber optic adapters are mounted to the spool and carried by the spool as the spool is rotated relative to the main housing body, and wherein the fiber optic connectors are inserted within the fiber optic adapters.

7. The telecommunications device of claim 1, wherein the spool rotates relative to the main housing body when the fiber optic cable is paid off from the spool, and wherein the fiber optic cable is routed through the first cable manager while the fiber optic cable is being paid off from the spool.

8. A telecommunications device comprising:
a main housing body including a major wall and a plurality of minor walls that extend outwardly from the major wall, the minor walls cooperating to define a perimeter of the main housing body;
a cover that mounts to the main housing body at a location opposite from the major wall, the minor walls extending between the major wall and the cover when the cover is mounted to the main housing body;
a connection interface between the cover and at least one of the minor walls, the connection interface allowing the cover to be slid relative to the minor walls in a direction generally parallel to the major wall between an uncaptured position and a captured position, wherein the cover can be removed from the main housing body in a direction generally perpendicular to the major wall when in the uncaptured position and is interlocked with the main housing body when in the captured position so as to not be removable from the main housing body in the direction generally perpendicular to the major wall;
at least one telecommunications component mounted within the main housing body; and
a first cable manager defining an opening for receiving a fiber optic cable, the first cable manager including a first portion connected to the main housing body and a second portion connected to the cover, wherein the first and second portions of the first cable manager cooperate to define the opening of the cable manager when the cover is in the captured position;
wherein a fiber optic cable is routed through the first cable manager, and wherein an inner surface of the first cable manager is curved to provide bend radius protection to the fiber optic cable.

9. The telecommunications device of claim 1, wherein thumbscrews are used to secure the cover in the captured position such that the cover is prevented from being unintentionally slid relative to the minor walls in the direction generally parallel to the major wall between the captured position and the uncaptured position.

10. The telecommunications device of claim 9, wherein the cover is interlocked with the main housing body while in the captured position by overlapping portions of the cover and at least one of the minor walls.

11. A telecommunications device comprising:
a main housing body including a major wall and a plurality of minor walls that extend outwardly from the major wall, the minor walls cooperating to define a perimeter of the main housing body;
a cover that mounts to the main housing body at a location opposite from the major wall, the minor walls extending between the major wall and the cover when the cover is mounted to the main housing body;
a connection interface between the cover and at least one of the minor walls, the connection interface allowing the cover to be slid relative to the minor walls in a direction generally parallel to the major wall between an uncaptured position and a captured position, wherein the cover can be removed from the main housing body in a direction generally perpendicular to the major wall when in the uncaptured position and is interlocked with the main housing body when in the captured position so as to not be removable from the main housing body in the direction generally perpendicular to the major wall;
at least one telecommunications component mounted within the main housing body; and
a first cable manager defining an opening for receiving a fiber optic cable, the first cable manager including a first portion connected to the main housing body and a second portion connected to the cover, wherein the first and second portions of the first cable manager cooperate to define the opening of the cable manager when the cover is in the captured position;
wherein the cable manager includes a first side and an opposite second side, wherein the opening extends through the cable manager from the first side to the second side, wherein the cable manager defines a mid region positioned between the first and second sides, wherein the opening flares out generally along a first curve as the opening extends in a first direction from the mid region toward first side of the cable manager and wherein the opening flares out generally along a second curve as the opening extends in a second direction from the mid region toward the second side of the cable manager.

12. The telecommunications device of claim 11, wherein the first and second curves have a radius of curvature that is equal.

13. The telecommunications device of claim 11, wherein the first cable manager is positioned adjacent a corner of the main housing body.

14. The telecommunications device of claim 1, wherein the first cable manager fully encloses the opening when the cover is in the captured position.

15. The telecommunications device of claim 1, wherein the first cable manager comprises a loop.

* * * * *